United States Patent
Murakami

(10) Patent No.: US 9,523,836 B2
(45) Date of Patent: Dec. 20, 2016

(54) IMAGE PICKUP DEVICE AND PROGRAM

(71) Applicant: Panasonic Corporation, Osaka (JP)

(72) Inventor: Masahiro Murakami, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 213 days.

(21) Appl. No.: 14/184,878

(22) Filed: Feb. 20, 2014

(65) Prior Publication Data

US 2014/0168383 A1    Jun. 19, 2014

Related U.S. Application Data

(63) Continuation of application No. PCT/JP2012/005491, filed on Aug. 30, 2012.

(30) Foreign Application Priority Data

Sep. 1, 2011  (JP) ................................. 2011-190318

(51) Int. Cl.
*H04N 15/00* (2006.01)
*H04N 13/02* (2006.01)
(Continued)

(52) U.S. Cl.
CPC . *G02B 7/09* (2013.01); *G02B 7/36* (2013.01); *G03B 35/08* (2013.01);
(Continued)

(58) Field of Classification Search
CPC ............. G02B 7/09; G02B 7/36; G03B 35/08; G03B 13/36; H04N 13/0239; H04N 13/0296; H04N 5/23212; H04N 13/0203
(Continued)

(56) References Cited

U.S. PATENT DOCUMENTS

2011/0018972 A1* 1/2011 Pan .................... H04N 5/23212
                                                                                 348/47
2011/0018978 A1* 1/2011 Ego .................... H04N 13/0022
                                                                                 348/51
(Continued)

FOREIGN PATENT DOCUMENTS

JP          08-242468 A      9/1996
JP         2006-162990 A     6/2006
(Continued)

OTHER PUBLICATIONS

International Search Report for corresponding International Application No. PCT/JP2012/005491 mailed Nov. 27, 2012.
(Continued)

*Primary Examiner* — Mehrdad Dastouri
*Assistant Examiner* — Jared Walker
(74) *Attorney, Agent, or Firm* — Renner, Otto, Boisselle & Sklar, LLP

(57) ABSTRACT

An image capture device includes: a first and second optical system including a first and second focus lens, respectively; a first image sensor that outputs an electrical signal representing a subject image that has been produced through the first focus lens; a second image sensor that outputs an electrical signal representing a subject image produced through the second focus lens; and a drive controller that moves the first and second focus lenses along their optical axes. The drive controller has the second focus lens follow a position determined by a position of the first focus lens until the first focus lens reaches a position close to in-focus position, and then moves the first and second focus lenses to in-focus positions independently of each other once the first focus lens has reached the position close to the in-focus position.

8 Claims, 8 Drawing Sheets

(51) Int. Cl.
G02B 7/09 (2006.01)
G02B 7/36 (2006.01)
H04N 5/232 (2006.01)
G03B 35/08 (2006.01)
G03B 13/36 (2006.01)

(52) U.S. Cl.
CPC ..... *H04N 5/23212* (2013.01); *H04N 13/0239* (2013.01); *H04N 13/0296* (2013.01); *G03B 13/36* (2013.01)

(58) Field of Classification Search
USPC .......................................................... 348/47
See application file for complete search history.

(56) References Cited

U.S. PATENT DOCUMENTS

| | | |
|---|---|---|
| 2011/0075018 A1 | 3/2011 | Kohama |
| 2011/0234768 A1 | 9/2011 | Pan |
| 2011/0279653 A1* | 11/2011 | Hoshino ................ G03B 35/02 348/47 |
| 2012/0154647 A1* | 6/2012 | Endo .................. H04N 13/0239 348/262 |

FOREIGN PATENT DOCUMENTS

| | | |
|---|---|---|
| JP | 2006-345246 A | 12/2006 |
| JP | 2010-103895 A | 5/2010 |
| JP | 2010-107664 A | 5/2010 |
| JP | 2010-113291 A | 5/2010 |
| JP | 2010-145771 A | 7/2010 |
| JP | 2011-075675 A | 4/2011 |
| JP | 2011-112809 A | 6/2011 |
| JP | 2011-172178 A | 9/2011 |

OTHER PUBLICATIONS

Form PCT/ISA/237 for corresponding International Application No. PCT/JP2012/005491 dated Nov. 27, 2012 and partial English translation.

* cited by examiner

IMAGE PICKUP DEVICE AND PROGRAM

This is a continuation of International Application No. PCT/JP2012/005491, with an international filing date of Aug. 30, 2012, which claims priority of Japanese Patent Application No. 2011-190318, filed on Sep. 1, 2011, the contents of which are hereby incorporated by reference.

BACKGROUND

1. Technical Field

The present disclosure relates to an autofocus (AF) operation to be performed by a two-lens 3D camera.

2. Description of the Related Art

A two-lens 3D camera which can obtain left- and right-eye images with parallax using two sets of optical systems and two image sensors and which can record the images as a three-dimensional (3D) image is known. Such a two-lens 3D camera is disclosed in Japanese Laid-Open Patent Publication No. 2010-103895, for example.

SUMMARY

In general, a digital camera performs an autofocus operation in order to focus on a subject of shooting in carrying out a shooting session. In a two-lens 3D camera, however, the shapes or arrangement of its left- and right-eye optical systems vary from one product to another. That is why if the autofocus operation was performed with respect to left and right eyes using video that has been obtained through only one of the two optical systems, the subject could not be automatically focused on appropriately. However, if autofocus operations were performed with respect to left and right eyes independently of each other based on the video that has been obtained by the left- and right-eye optical systems, then the subject on which the left-eye optical system has focused could disagree with the subject on which the right-eye optical system has focused.

The present disclosure provides a technique for getting an autofocus operation done on a subject appropriately even when a two-lens 3D camera is used.

An image capture device according to an embodiment of the present disclosure includes: a first optical system including a first focus lens; a second optical system including a second focus lens; a first image sensor configured to output an electrical signal representing a subject image that has been produced through the first focus lens; a second image sensor configured to output an electrical signal representing a subject image that has been produced through the second focus lens; and a drive controller configured to move the first focus lens along an optical axis of the first optical system and the second focus lens along an optical axis of the second optical system. The drive controller is configured to (i) have the second focus lens follow a position determined by a position of the first focus lens until the first focus lens reaches a position close to an in-focus position and then (ii) move the first and second focus lenses to in-focus positions independently of each other once the first focus lens has reached the position close to the in-focus position.

According to a technique of the present disclosure, even a two-lens 3D camera can also perform an autofocus operation on the subject appropriately.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

(Embodiment 1)

First of all, a digital camcorder as a first embodiment will be described with reference to the accompanying drawings.

[1-1. Configuration for Digital Camcorder]

Figure 1:
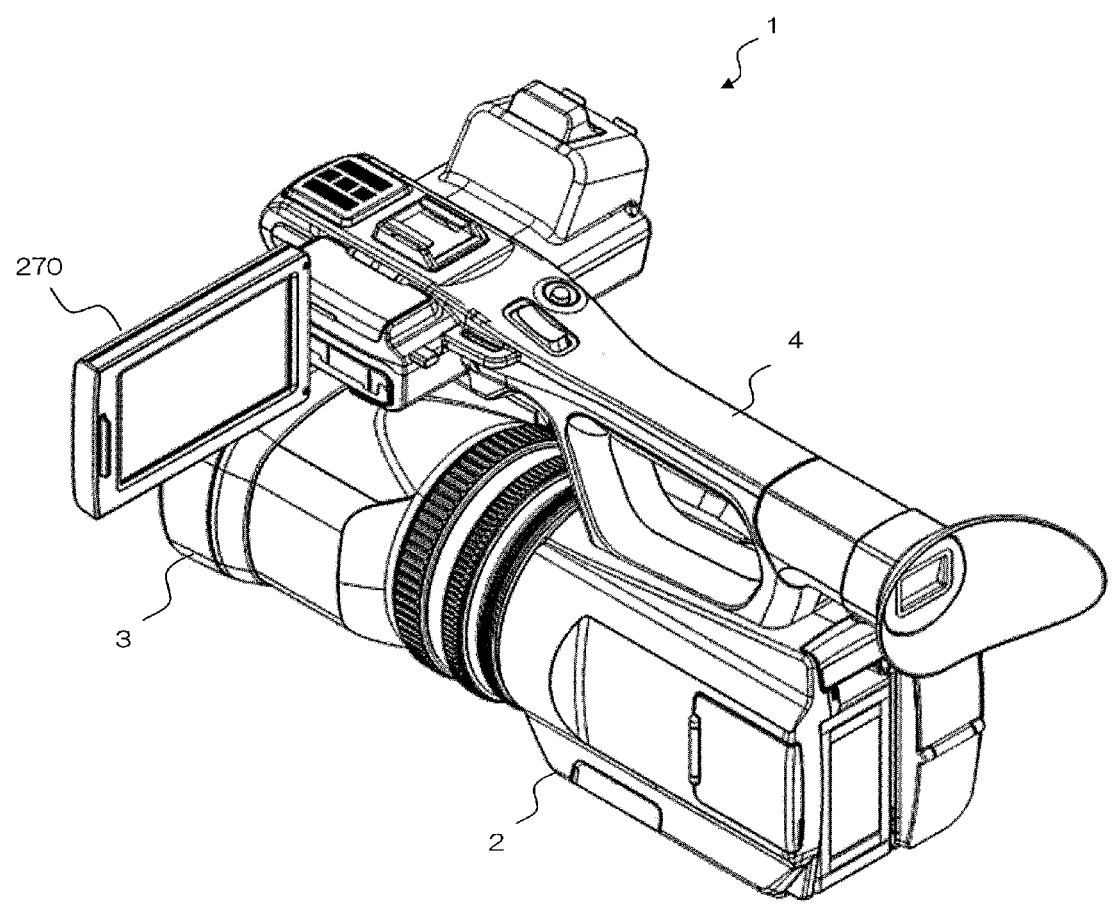
FIG. 1 is a perspective view illustrating the appearance of a digital camcorder 1 as a first embodiment.

FIG. 1 is a perspective view illustrating the appearance of a digital camcorder 1 as a first embodiment. As shown in FIG. 1, the digital camcorder 1 includes a camera body 2, a lens unit 3, a handle unit 4, and an LCD monitor 270. The lens unit 3 houses a right-eye optical system, a left-eye optical system, and various kinds of actuators inside. The camera body 2 has a controller, an image processor and other circuit components built in.

Figure 2:
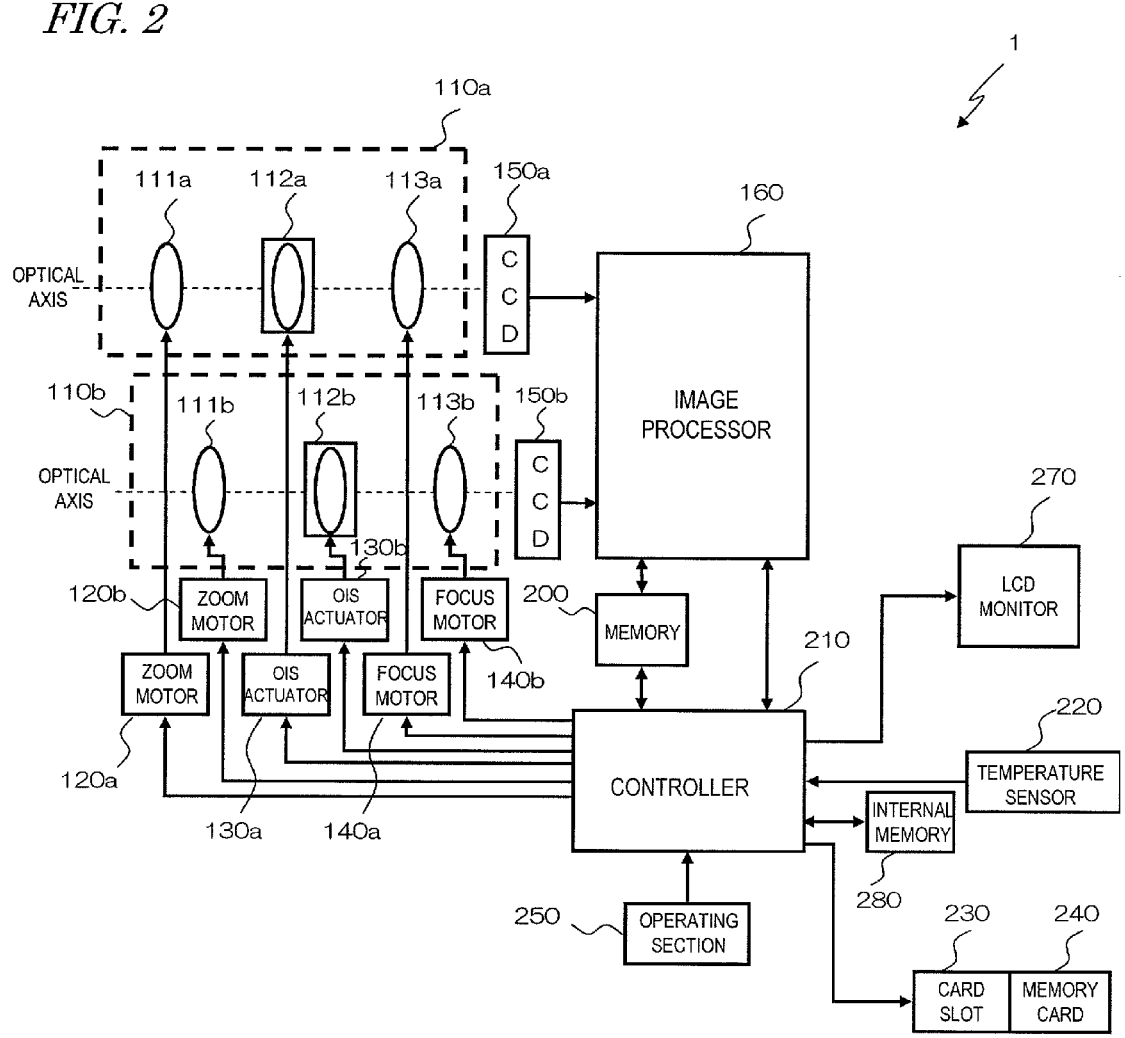
FIG. 2 is a block diagram generally illustrating an electrical configuration for the digital camcorder 1 of the first embodiment.

FIG. 2 is a block diagram generally illustrating a physical configuration for a digital camcorder 1 according to this embodiment. In FIG. 2, the arrows indicate how respective components of this digital camcorder 1 are electrically connected together and how signals flow between them.

This digital camcorder 1 includes optical systems 110a and 110b, zoom motors 120a and 120b, OIS actuators 130a and 130b, focus motors 140a and 140b, CCD image sensors 150a and 150b, an image processor 160, a memory 200, a controller 210, a temperature sensor 220, a card slot 230, a memory card 240, an operating section 250, an LCD monitor 270, and an internal memory 280.

The optical system 110a includes a zoom lens 111a, an OIS (optical image stabilizer) 112a, and a focus lens 113a. Likewise, the optical system 110b also includes a zoom lens 111b, an OIS 112b, and a focus lens 113b. The optical system 110a produces a subject image as viewed from a first viewpoint on the image capturing plane of the CCD image sensor 150a. Meanwhile, the optical system 110b produces a subject image as viewed from a second viewpoint, which is different from the first viewpoint, on the image capturing plane of the CCD image sensor 150b. In this embodiment, the first viewpoint corresponds to a right-eye viewpoint and the second viewpoint corresponds to a left-eye viewpoint.

By moving the zoom lenses 111a and 111b along the optical axes of the optical systems 110a and 110b, respectively, the subject images produced on the CCD image sensors 150a and 150b can be either zoomed in on or zoomed out. The zoom lenses 111a and 111b are controlled by the zoom motors 120a and 120b, respectively. Each of the zoom lenses 110a and 110b is illustrated in FIG. 2 as a single lens for the sake of simplicity, but is typically a combination of multiple lenses.

Each of the OIS's 112a and 112b includes an image stabilizer lens which can move internally within a plane that intersects with the optical axis at right angles. Specifically, the OIS's 112a and 112b respectively drive the image stabilizer lenses in such a direction as to cancel the shake of the digital camcorder 1 during shooting, thereby reducing the shakiness (i.e., motion blur) of the subject image. Also, according to this embodiment, by shifting the respective image stabilizer lenses of the OIS's 112a and 112b either toward their center or outward, the point of convergence can be adjusted so as to be located more distant from, or closer to, the digital camcorder 1. The OIS's 112a and 112b are driven by the OIS actuators 130a and 130b, respectively. Each of the image stabilizer lenses is illustrated as a single lens in FIG. 2. but may also be a combination of multiple lenses.

By moving the focus lenses 113a and 113b along the optical axes of the optical systems 110a and 110b, respectively, the focuses of the subject images to be produced on the respective image capturing planes of the CCD image sensors 150a and 150b are adjusted. The focus lenses 113a and 113b are controlled by the focus motors 140a and 140b, respectively. Each of the focus lenses 113a and 113b is illustrated as a single lens in FIG. 2 but may also be a combination of multiple lenses.

In the following description, these optical systems 110a and 110b will be sometimes collectively referred to herein as an "optical system 110". The same can be said about the zoom lenses 111, OIS's 112, focus lenses 113, zoom motors 120, OIS actuators 130, focus motors 140 and CCD image sensors 150. Also, in the following description, the optical system 110a for use to generate an image as viewed from the right eye and its zoom lens 111a and focus lens 113a included there will be sometimes referred to herein as a "right-eye optical system 110a", a "right-eye zoom lens 111a" and a "right-eye focus lens 113a", respectively. Likewise, the optical system 110b for use to generate an image as viewed from the left eye and its zoom lens 111b and focus lens 113b included there will be sometimes referred to herein as a "left-eye optical system 110b", a "left-eye zoom lens 111b" and a "left-eye focus lens 113b", respectively.

The zoom motors 120a and 120b drive and control the zoom lenses 111a and 111b, respectively. The zoom motors 120a and 120b may be implemented as pulse motors, DC motors, linear motors or servo motors, for example. If necessary, the zoom motors 120a and 120b may drive the zoom lenses 111a and 111b via a cam mechanism, a ball screw, or any other appropriate mechanism. Optionally, the optical systems 110a and 110b may be configured to control the zoom lenses 111a and 111b synchronously using a common drive mechanism.

The OIS actuators 130a and 130b drive and control the image stabilizer lenses in the OIS's 112a and 112b, respectively, within planes that intersect with their optical axes at right angles. The OIS actuators 130a and 130b may be implemented as planar coils or ultrasonic motors, for example.

The focus motors 140a and 140b drive and control the focus lenses 113a and 113b, respectively. The focus motors 140a and 140b may be implemented as pulse motors, DC motors, linear motors or servo motors, for example. If necessary, the focus motors 140a and 140b may drive the focus lenses 113a and 113b via a cam mechanism, a ball screw, or any other appropriate mechanism.

The CCD image sensors 150a and 150b photoelectrically convert the subject images that have been produced by the optical systems 110a and 110b, thereby outputting electrical signals. In the following description, those electrical signals output by the CCD image sensors 150a and 150b will be sometimes referred to herein as a "first viewpoint signal" and a "second viewpoint signal", respectively. The CCD image sensors 150a and 150b perform various kinds of operations including exposure, transfer and electronic shuttering that need to be done for shooting. Optionally, the CCD image sensors may be replaced with any other kind of image sensors such as CMOS image sensors.

The image processor 160 subjects the first and second viewpoint signals that have been generated by the CCD image sensors 150a and 150b to various kinds of processing. For example, the image processing section 160 processes the first and second viewpoint signals, thereby generating either image data to be displayed on the LCD monitor 270 (which will be referred to herein as a "review image") or image data to be stored back into the memory card 240 again. For instance, the image processing section 160 may subject the first and second viewpoint signals to gamma correction, white balance correction, flaw correction and various other sorts of image processing.

In addition, in performing 3D image processing, the image processing section 160 also carries out cropping processing on the first and second viewpoint signals. If there were a vertical shift between the first and second viewpoint signals that form a 3D image, the viewer would find such a 3D image unnatural. However, by correcting the vertical cropping position, such unnaturalness can be reduced. In this manner, a 3D image is generated based on a pair of image areas that have been cropped from the first and second viewpoint signals.

Furthermore, the image processing section 160 compresses the first and second viewpoint signals that have been processed as described above in compression formats that are compliant with a predetermined file system standard. Then, two compressed image signals that have been obtained by compressing the first and second viewpoint signals are written on the memory card 240 so as to be associated with each other. Also, if the image signals to compress are moving pictures, then a moving picture compression standard such as H. 264 or MPEG4 AVC is applied. Optionally, data in the MPO file format in which two sets of image data are saved so as to be associated with each other and either a JPEG image or an MPEG moving picture may be written simultaneously.

The image processing section 160 may be implemented as a digital signal processor (DSP) or a microcontroller (or microcomputer). The resolution (i.e., number of pixels) of the review image may be set to be either the screen resolution of the LCD monitor 270 or the resolution of image data that has been generated by being compressed in a compression format compliant with the JPEG standard.

The memory 200 functions as a work memory for the image processing section 160 and the controller 210. The memory 200 temporarily stores either the image signal that has been processed by the image processing section 160 or the image data supplied from the CCD image sensor 150 before being processed by the image processing section 160. In addition, the memory 200 temporarily stores information indicating a shooting condition on the optical systems 110*a* and 110*b* and on the CCD image sensors 150*a* and 150*b* during shooting. Examples of the shooting condition include a subject distance, angle of view information, ISO sensitivity, a shutter speed, an EV value, an F number, a lens to lens distance, a shooting timestamp, and the magnitude of OIS shift. The memory 200 may be implemented as a DRAM or a ferroelectric memory, for example.

The internal memory 280 may be implemented as a flash memory or a ferroelectric memory, for example, and may store a control program for controlling the overall digital camcorder 1, for example.

The controller 210 performs an overall control on this digital camcorder 1. The controller 210 may be implemented as either only a single piece of hardware or a combination of hardware and software. For example, the controller 210 could be a microcomputer. The controller 210 may control the respective sections in accordance with a control program which is stored in the internal memory 280, for example.

The temperature sensor 220 detects the temperature of the environment surrounding the housing of this digital camcorder 1 as a voltage. Then, the temperature sensor 220 A/D converts the voltage representing the temperature detected and notifies the controller 210 of the temperature. As a result, the controller 210 can know the temperature of the environment surrounding the housing. The temperature detected may be used to control the autofocus operation as will be described later. It should be noted that when a shooting session is being carried out, one of the left- and right-eye optical systems 110*a* and 110*b* could be in the sun and the other could be in the shade. In that case, there would be a significant temperature difference between the respective barrels of the right and left optical systems. That is why two temperature sensors 220 may be provided for the left and right optical systems, respectively, so that the environmental temperatures of those optical systems can be measured independently of each other.

The card slot 230 is an interface to/from which the memory card 240 is readily attachable and removable. The card slot 230 is connectible both mechanically and electrically to the memory card 240.

The memory card 240 includes an internal memory such as a flash memory or a ferroelectric memory and can store data. On the memory card 240 connected to the card slot 230, 3D video or still picture that has been shot can be written. It should be noted that the memory card 240 does not form an integral part of the camcorder 1 but is an external storage medium.

The operating section 250 is a generic term which collectively refers to various user interfaces which accept a user's instruction. For example, the operating section 250 may include an operating dial and a recording start button which accept the user's instructions.

The LCD monitor 270 is a display device which can make a 2D or 3D display of the first and second viewpoint signals that have been generated by the CCD image sensors 150 or the first and second viewpoint signals that have been read from the memory card 240. The LCD monitor 270 can also display various kinds of setting information about the digital camcorder 1. For example, the LCD monitor 270 can display pieces of setting information including an EV value, an F number, a shutter speed, and an ISO sensitivity, which are a number of parameters that form the shooting condition during the shooting session.

It should be noted that these components are just an exemplary combination and the digital camcorder 1 may include any other components or have some of these components omitted as long as the digital camcorder 1 can perform the operation to be described later.

[1-2. Operation]

Next, it will be described how the digital camcorder 1 performs its autofocus (AF) operation during a shooting session.

Figure 3:
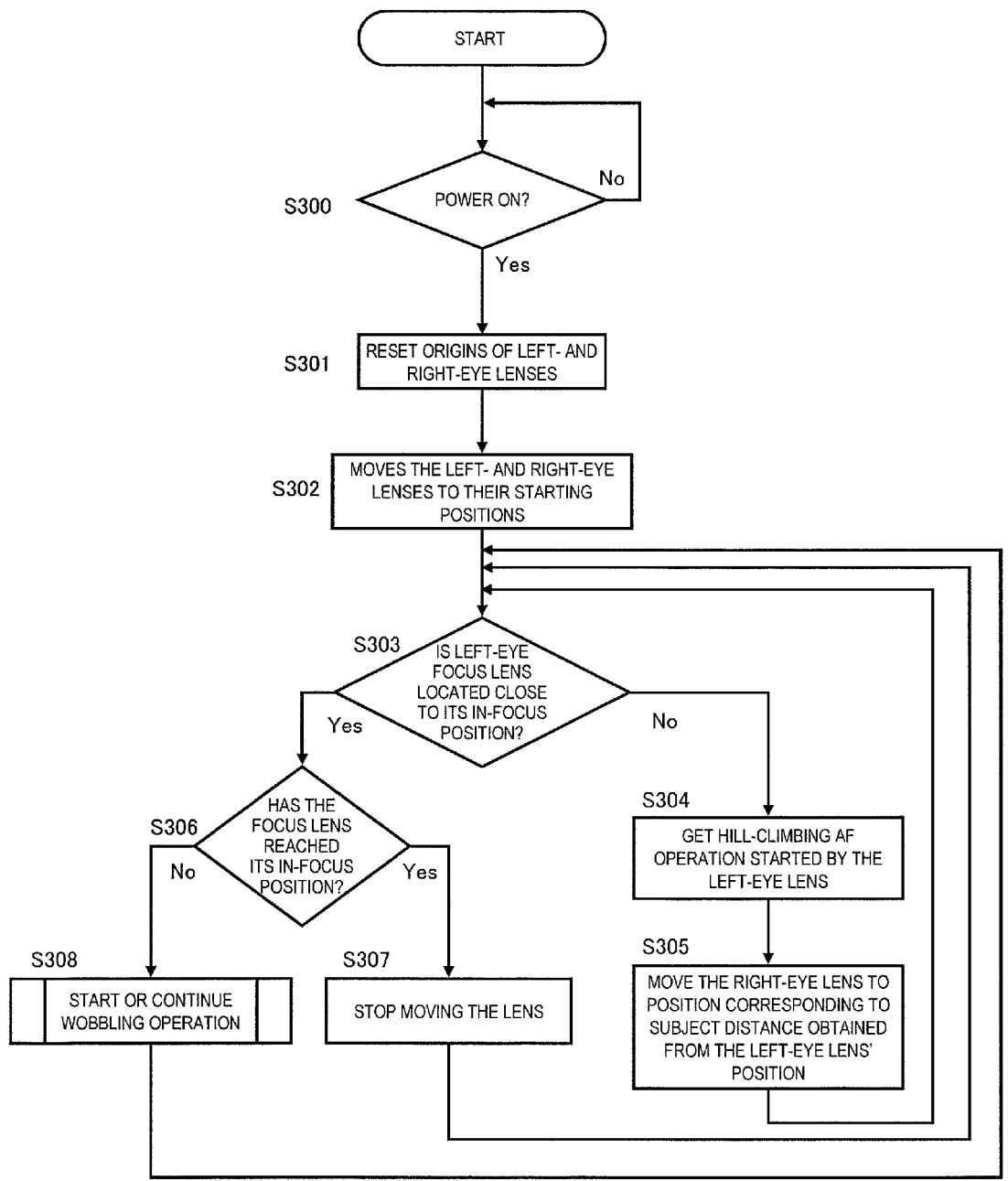
FIG. 3 is a flowchart showing generally how the digital camcorder 1 of the first embodiment performs its AF operation.

FIG. 3 is a flowchart showing generally how the digital camcorder 1 of this embodiment performs its AF operation. The controller 210 is seeing if the power has been turned ON (in Step S300). On sensing that the power has been turned ON (if the answer to the query of the processing step S300 is YES), the controller 210 gets power supplied to respective components that form this digital camcorder 1. When the power is supplied, the digital camcorder 1 sets up the optical systems 110*a* and 110*b* and the CCD image sensors 150*a* and 150*b* so as to get ready for a shooting session. Specifically, the controller 210 resets the origins of respective lenses that form the right- and left-eye optical systems. 110*a* and 110*b*. More specifically, at this point in time, the controller 210 resets the respective origins of the right-eye focus lens 113*a*, the left-eye focus lens 113*b*, the right-eye zoom lens 111*a* and the left-eye zoom lens 111*b* (in Step S301). In this description, "to reset the origins" refers herein to the operation of determining the origins of respective lenses in their optical axis direction using sensors (not shown) which are provided for the right- and left-eye focus lenses 113 and zoom lenses 111. By moving the respective lenses to the positions where they can be detected by these sensors, the positions of these sensors are determined as the origins of their associated lenses. As a result, the controller 210 can see exactly the absolute positions of the right- and left-eye focus lenses 113*a* and 113*b* and the right- and left-eye zoom lenses 111*a* and 111*b* during the autofocus operation.

After having reset the origins, the controller 210 moves the right- and left-eye focus lenses 113*a* and 113*b* to their starting positions (in Step S302). In this case, the starting positions may be either the positions that have been determined in advance by the controller 210 or the positions of the focus lenses which have been memorized since the power was turned OFF last time and to which those lenses have been returned.

When the optical systems 110a and 110b, the CCD image sensors 150a and 150b and other components are set up completely, the digital camcorder 1 is ready to start a shooting session. That is to say, a through-the-lens image, which is an image being captured by the CCD image sensor 150, starts to be displayed on the LCD monitor 270, when the controller 210 starts an AF operation. As a result, no matter when the user presses the movie recording button, the controller 210 can start recording a movie with its optical systems already focused on the subject.

The AF operation is carried out by moving the focus lens 113 so that the contrast value to be calculated based on high frequency components of the image's spatial frequency becomes maximum. There is a certain relation between the positions of the focus lens 113 and zoom lens 111, which varies according to the distance from the digital camcorder 1 to the subject (which will be sometimes referred to herein as a "subject distance"). A curve representing the relation between the respective positions of the focus lens 113 and zoom lens 111 to be defined on a subject distance basis will be referred to herein as a "zoom tracking curve" or simply a "tracking curve".

Figure 4:
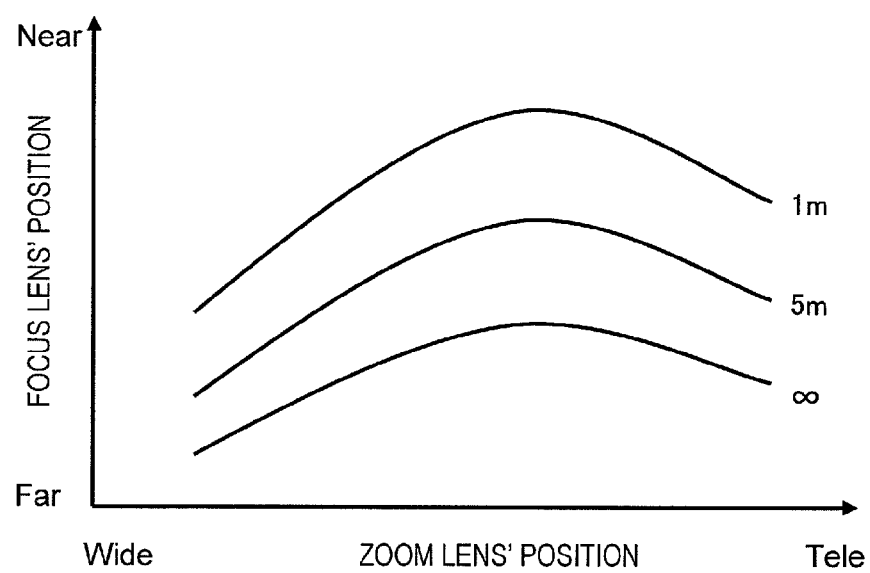
FIG. 4 is a graph showing exemplary zoom tracking curves.

FIG. 4 is a graph showing exemplary zoom tracking curves. Specifically, three zoom tracking curves in situations where the subject distances are infinity, 5 m and 1 m, respectively, are shown in FIG. 4. Such zoom tracking curves are defined more finely (e.g., on a several ten centimeter basis) for respective subject distances. The zoom tracking curve is determined as a result of the adjustment of the digital camcorder 1 just before it is shipped and recorded as either a table or a function in the internal memory 280, for example. When the controller 210 is moving one of the focus lens 113 and the zoom lens 111, the other lens is also moved based on the zoom tracking curve.

When the digital camcorder 1 is ready to start a shooting session, the image processing section 160 is calculating the contrast value of the image being shot in real time based on the image data supplied from the CCD image sensors 150a and 150b. Then, the image processing section 160 notifies in real time the controller 210 of the contrast value that has been calculated. As a result, the controller 210 can monitor a variation in contrast value in real time.

Based on this contrast value, the controller 210 determines whether or not the left-eye focus lens 113b is located in the vicinity of the in-focus position (in Step S303). In this description, the "in-focus position" refers herein to the position of the focus lens 113 when the subject image produced on the image capturing plane of the CCD image sensor 150 is in focus. In this case, first, the controller 210 compares the absolute values of the contrast values to be sequentially calculated for images being obtained through the left-eye optical system 110b to a predetermined threshold value. If the absolute value of the contrast value is equal to or greater than a predetermined value, the controller 210 decides that the left-eye focus lens 113b be located in the vicinity of the in-focus position (i.e., the answer to the query of the processing step S303 is YES). Also, even if the absolute value of the contrast value is smaller than a predetermined value but unless the contrast values to be sequentially calculated vary to a predetermined degree or more, the decision is also made by the controller 210 that the left-eye focus lens 113b is located in the vicinity of the in-focus position (i.e., the answer to the query of the processing step S303 is YES). On the other hand, if the absolute value of the contrast value is smaller than the predetermined value and if the contrast values to be sequentially calculated vary to a predetermined degree or more, the controller 210 decides that the left-eye focus lens 113b be not located in the vicinity of the in-focus position (i.e., the answer to the query of the processing step S303 is NO).

If the decision is made that the left-eye focus lens 113b is not located in the vicinity of the in-focus position (i.e., the answer to the query of the processing step S303 is NO), then the controller 210 gets a hill-climbing AF operation started by the left-eye focus lens 113b (in Step S304). In this description, the "hill-climbing AF operation" refers herein to the operation of measuring the contrast value of the image while moving the focus lens in one direction from its starting position and moving the focus lens to a position where the contrast value is maximized. First of all, while getting the left-eye focus lens 113b moved by the left-eye focus motor 140b, the controller 210 monitors a variation in the left-eye contrast values being sequentially calculated by the image processing section 160. In this case, when finding the contrast values being calculated sequentially increasing gradually, the controller 210 decides that the left-eye focus lens 113b be approaching the in-focus position and maintains its moving direction. On the other hand, on sensing a decrease in left-eye contrast value that has been sensed to rise continuously as the left-eye focus lens 113b is moved, the controller 210 decides that the left-eye focus lens 113b have passed the in-focus position. As a result, the controller 210 detects the peak value of the left-eye contrast value (i.e., a value associated with the in-focus position) and can move the left-eye focus lens 113b according to the peak value detected.

While the left-eye focus lens 113b is performing the hill-climbing AF operation, the controller 210 sequentially detects the current positions of the left-eye focus lens 113b and left-eye zoom lens 111b. By reference to the zoom tracking curve associated with the left-eye optical system 110b, the controller 210 finds the subject distance associated with the respective current positions of the left-eye focus lens 113b and left-eye zoom lens 111b. Subsequently, by reference to the zoom tracking curve associated with the right-eye optical system 110a, the controller 210 finds the position of the right-eye focus lens 113a, which is associated with the subject distance being sequentially detected for the left-eye side, by reference to the current position of the right-eye zoom lens 111a. Then, the controller 210 gets the right-eye focus lens 113a moved to that determined position by the focus motor 140a (in Step S305). That is to say, the right-eye focus lens 113a follows the left-eye focus lens 113b moving. As a result, the left- and right-eye focus lenses 113b and 113a can set their focuses on the same subject.

While the decision is made in Step S303 that the left-eye focus lens 113b is not located in the vicinity of the in-focus position, the controller 210 performs the processing steps S304 and S305 over and over again. In Step S305, if the absolute value of the contrast value obtained by the image processing section 160 is equal to or greater than a predetermined value when the left-eye focus lens 113b is moved according to the peak value of the contrast value for the left-eye side (i.e., a value associated with the in-focus position) that has been detected, then the controller 210 decides that the left-eye focus lens 113b be located in the vicinity of the in-focus position.

If the decision is made in Step S303 that the focus lens 113b is located in the vicinity of the in-focus position, then the controller 210 determines whether or not the left-eye focus lens 113b is located at the in-focus position (in Step S306). In the same way, the controller 210 also determines whether or not the right-eye focus lens 113a is located at the in-focus position (in Step S306). This decision is made by seeing if at most a predetermined degree of variation in the contrast value to be sequentially calculated by the image processing section 160 lasts for a predetermined period of time. On sensing that at most a predetermined degree of variation in the contrast value for the left-eye side lasts for a predetermined period of time, the controller 210 decides that the left-eye focus lens 113b be located at the in-focus position (i.e., the answer to the query of the processing step S306 is YES) and stops moving the left-eye focus lens 113b (in Step S307). In the same way, on sensing that at most a predetermined degree of variation in the contrast value for the right-eye side lasts for a predetermined period of time, the controller 210 decides that the right-eye focus lens 113a be located at the in-focus position (i.e., the answer to the query of the processing step S306 is YES) and stops moving the right-eye focus lens 113a (in Step S307). This decision is made for the left- and right-eye focus lenses independently of each other. That is to say, on deciding that only one of the left- and right-eye focus lenses be located at the in-focus position, the controller 210 stops only that focus lens and performs the processing step S308 on the other focus lens. As a result, if the focus has been set on the subject, the motion blur of the image to be displayed on the LCD monitor 270 due to the AF operations performed by the left- and right-eye focus lenses 113b and 113a can be reduced significantly. After having performed this processing step S307, the controller 210 returns to the processing step S303 again.

If the controller 210 decides in Step S306 that the left-eye focus lens 114b be not located at the in-focus position (i.e., if the answer to the query of the processing step S306 is NO), a wobbling operation starts to be performed on the left-eye focus lens 113b using the left-eye focus motor 140b (in Step S308). In the same way, if the controller 210 decides that the right-eye focus lens 113a be not located at the in-focus position (i.e., if the answer to the query of the processing step S306 is NO), a wobbling operation starts to be performed on the right-eye focus lens 113a using the right-eye focus motor 140a (in Step S308). In this description, the "wobbling operation" refers herein to an operation of calculating the contrast value while vibrating the focus lens 113 subtly along the optical axis and gradually bringing the focus lens 113 to an in-focus state while determining its moving direction. The controller 210 defines either a direction in which the focus is going farther away from the lens (which will be referred to herein as a "distancing direction" or a "far side") or a direction in which the focus is coming closer to the lens (which will be referred to herein as a "nearing direction" or a "near side") to be the direction in which the focus lens 113 should move if the contrast value increases in that direction.

In this embodiment, the wobbling operation is performed on a video frame basis. That is to say, operations including calculating the contrast values on the "far" and "near" sides and moving the focus lens are performed within one frame period (of 1/30 seconds, for example). In other words, the loop of the processing steps S303, S306 and S308 shown in FIG. 3 is carried out once a frame period.

As described above, the processing steps S306, S307 and S308 are performed on the left- and right-eye focus lenses 113b and 113a independently of each other. The wobbling operation in Step S308 will be described later. When the processing step S308 is done, the process goes back to the processing step S303 again. If the wobbling operation has already been started when the decision is made in Step S306, then the processing step S308 should be continuing the wobbling operation.

As described above, according to the AF operation of this embodiment, if the decision is made that the left-eye focus lens 113b be not located in the vicinity of the in-focus position, a hill-climbing AF operation is performed on the left-eye focus lens 113b. And in accordance with the result of the hill-climbing AF operation, the right-eye focus lens 113a is made to follow the left-eye focus lens 113b. On the other hand, if the decision has been made that the left-eye focus lens 113b be located in the vicinity of the in-focus position, wobbling operations are performed on the left- and right-eye focus lenses 113b and 113a independently of each other, thereby brining the left-eye focus lens 113b even closer to the in-focus state. As long as the power is kept ON and the mode of operation is shooting mode, the digital camcorder 1 performs the same series of processing steps S303 to S308 over and over again. On the other hand, if the power has been turned OFF or the modes of operation have been changed into the playback mode while the processing steps S303 through S308 are being performed, then the controller 210 ends the AF operation. It should be noted that the modes of operation can be changed from the shooting mode into the playback mode, or vice versa, by having the user enter his or her instruction using the operating section 250, for example.

Figure 5:
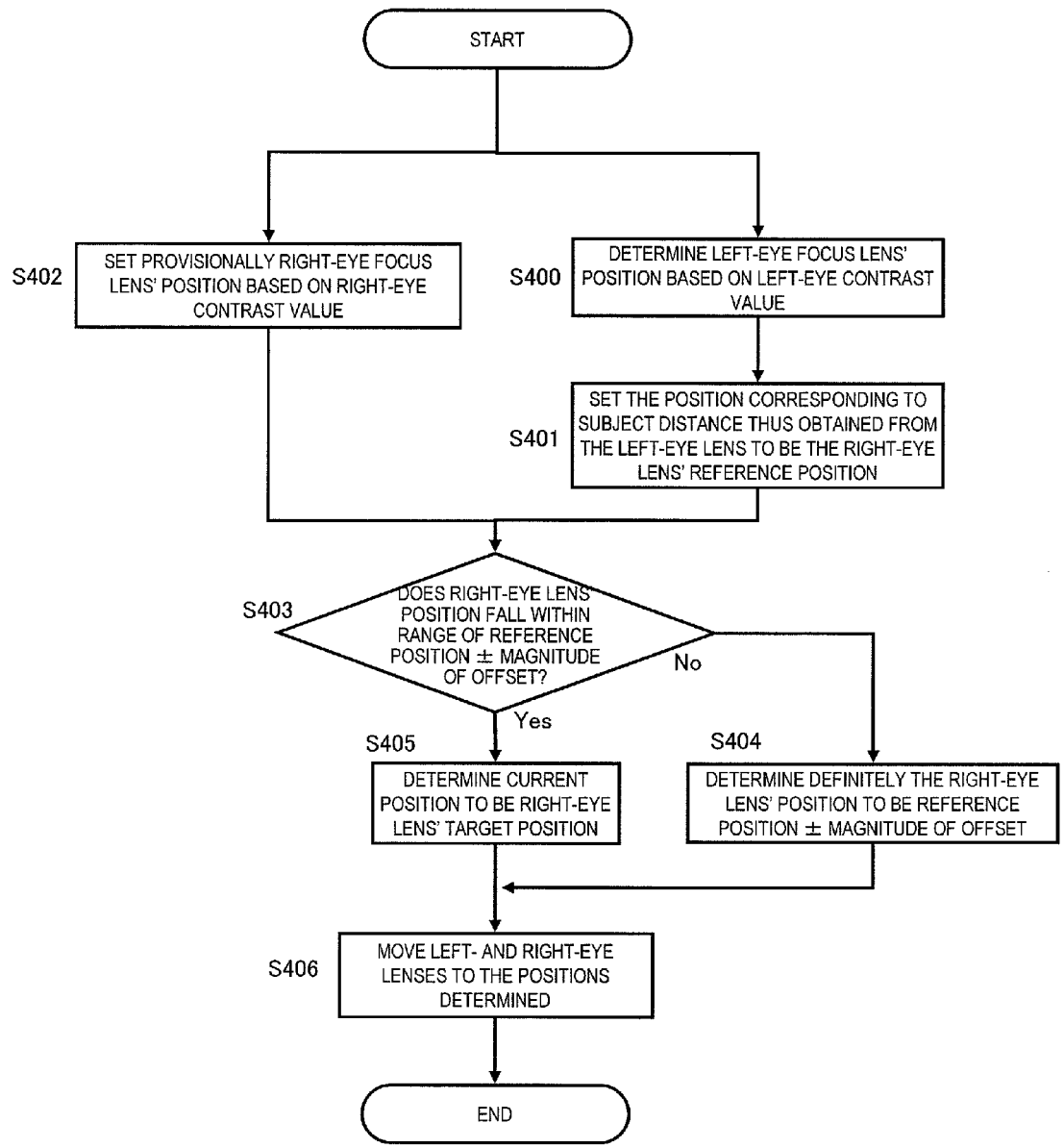
FIG. 5 is a flowchart showing a detailed procedure in which the digital camcorder 1 of the first embodiment performs the AF operation.

Next, the processing step S308 will be described in further detail with reference to FIG. 5, which is a flowchart showing a detailed procedure in which the digital camcorder 1 of this embodiment performs the AF operation.

The controller 210 determines the position to which the left-eye focus lens 113b should be moved next according to a variation in the left-eye contrast value to be sequentially calculated while the wobbling operation is being performed on the left-eye focus lens 113b (in Step S400). That is to say, while performing the wobbling operation, the controller 210 compares a contrast value obtained in a situation where the left-eye focus lens 113b has moved to the "far" side to a contrast value obtained in a situation where the left-eye focus lens 113b has moved to the "near" side, thereby determining exactly to what position in the direction with the higher contrast value the left-eye focus lens 113b should be moved. As for how much the left-eye focus lens 113b should be moved, a predetermined distance may have been defined in advance. Or a distance that varies according to the absolute value of the contrast value may also be determined. It should be noted that if the decision has been made in Step S306 that the left-eye focus lens 113b is located at the in-focus position, no wobbling operation is performed but the left-eye focus lens 113b stays at its position.

While the left-eye focus lens 113b is performing the wobbling AF operation, the controller 210 sequentially senses the current positions of the left-eye focus lens 113b and left-eye zoom lens 111b. By reference to the zoom tracking curve associated with the left-eye optical system 110b, the controller 210 finds the subject distance associated with the current positions of the left-eye focus lens 113b and left-eye zoom lens 111b. Subsequently, by reference to the zoom tracking curve associated with the right-eye optical system 110a, the controller 210 determines the position of the right-eye focus lens 113a, which is associated with the subject distance that is sequentially detected for the left-eye side, based on the current position of the right-eye zoom lens 111a. Then, the controller 210 sets the position of the right-eye focus lens 113a thus determined to be the reference position of the right-eye focus lens 113a during the wobbling operation (in Step S401). In this case, the reference position during the wobbling operation corresponds to the current position of the left-eye focus lens 113b, and is the center position of the range in which the right-eye focus lens 113a can be moved in the operation to be described later.

In parallel with the processing step S400, the controller 210 sets provisionally the position to which the right-eye focus lens 113a should be moved next according to a variation in the right-eye contrast value to be sequentially calculated while the wobbling operation is being performed on the right-eye focus lens 113a (in Step S402). That is to say, while performing the wobbling operation, the controller 210 compares a contrast value obtained in a situation where the right-eye focus lens 113a has moved to the "far" side to a contrast value obtained in a situation where the right-eye focus lens 113a has moved to the "near" side, thereby determining provisionally to what position in the direction with the higher contrast value the right-eye focus lens 113a should be moved. As for how much the right-eye focus lens 113a should be moved, a predetermined distance may have been defined in advance. Or a distance that varies according to the absolute value of the contrast value may also be determined. It should be noted that if the decision has been made in Step S306 that the right-eye focus lens 113a is located at the in-focus position, no wobbling operation is performed but the current position of the right-eye focus lens 113a is set to be the provisionally set position.

Subsequently, the controller 210 determines whether or not the position of the right-eye focus lens 113a that has been set provisionally in Step S402 falls within a range that is provided with a predetermined offset with respect to the reference position that has been determined in Step S401 (in Step S403). If the answer to the query of the processing step S403 is YES, the controller 210 definitely determines the position of the right-eye focus lens 113a that has been set provisionally in Step S402 to be the position to which the right-eye focus lens 113a should be actually moved (in Step S405). On the other hand, if the answer to the query of the processing step S403 is NO, then the controller 210 cancels the position of the right-eye focus lens 113a that has been set provisionally in Step S402 and definitely determines a position which is distant from the reference position by the magnitude of offset to be the position to which the right-eye focus lens 113a should be actually moved (in Step S404). In this case, if the position of the right-eye focus lens 113a has been set provisionally in Step S402 on the "far" side with respect to the reference position, the position that is away from the reference position on the "far" side by the magnitude of offset is determined definitely to be the position to which the right-eye focus lens 113a should be actually moved. On the other hand, if the position of the right-eye focus lens 113a has been set provisionally in Step S402 on the "near" side with respect to the reference position, the position that is away from the reference position on the "near" side by the magnitude of offset is determined definitely to be the position to which the right-eye focus lens 113a should be actually moved. That is to say, according to the current position of the left-eye focus lens 113b, the destination of the right-eye focus lens 113a is limited to the range that is away from the reference position by the predetermined magnitude of offset. Optionally, if the answer to the query of the processing step S403 is NO, not the position that is away from the reference position by the magnitude of offset but any other position falling within the range of reference position -1 magnitude of offset may be determined definitely to be the position to which the right-eye focus lens 113a should be moved actually.

If it has turned out, in Step S403, that the position of the right-eye focus lens 113a falls outside of the range of reference position±magnitude of offset, then it means that the right-eye focus lens 113a is in focus with a different subject from the subject with which the left-eye focus lens 113b is in focus. In that case, by moving the right-eye focus lens 113a compulsorily to a position that is away from the reference position by the magnitude of offset, the right-eye focus lens 111a will be brought in focus just as intended in the next control loop.

Once the destination to which the right-eye focus lens 113a should be moved has been determined definitely, the controller 210 moves the left and right-eye focus lenses 113b and 113a to their respective positions that have been determined (in Step S406). That is to say, the controller 210 moves the left-eye focus lens 113b to the position that has been determined in Step S400. And the controller 210 also moves the right-eye focus lens 113a to the position that has been determined definitely in either Step S404 or Step S405.

Figure 6A:
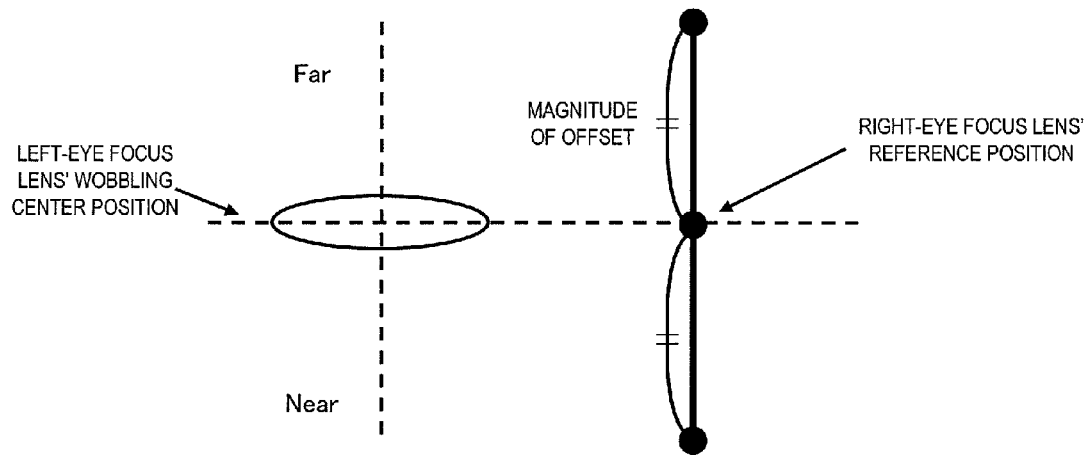
FIG. 6A illustrates conceptually how the reference position of the wobbling enabled range of a right-eye focus lens is determined with respect to the center position of the wobbling operation of a left-eye focus lens in the digital camcorder 1 of the first embodiment.
Figure 6B:
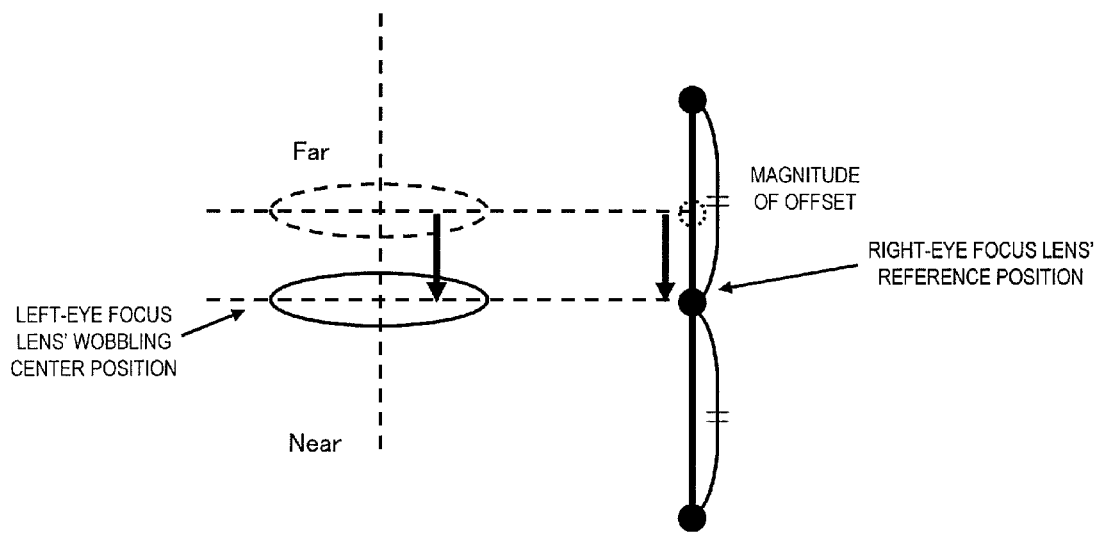
FIG. 6B illustrates conceptually how the reference position of the wobbling enabled range of the right-eye focus lens shifts as the center position of the wobbling operation of the left-eye focus lens shifts in the digital camcorder 1 of the first embodiment.

Hereinafter, it will be described with reference to FIGS. 6A and 6B exactly how to shift the reference position of the destination range of the right-eye focus lens 113a in real time according to the position of the left-eye focus lens 113b during the wobbling operation. FIGS. 6A and 6B illustrate conceptually how the reference position of the wobbling enabled range of the right-eye focus lens 113a shifts as the center position of the wobbling operation of the left-eye focus lens 113b shifts in the digital camcorder 1 of this embodiment.

FIG. 6A illustrates the position of the left-eye focus lens 113b at a certain point in time and a range that can be set as the destination of the right-eye focus lens 113a. As shown in FIG. 6A, when the left-eye focus lens 113b is performing a wobbling operation around a certain position, the reference position of the right-eye focus lens 113a is set to be a position that is located at the subject distance as measured from the former position. Then, as shown in FIG. 6A, the range which is defined by the magnitude of offset on each of the "far" and "near" sides with respect to the reference position becomes a range in which the center position of the wobbling operation by the right-eye focus lens 113a can be set.

FIG. 6B illustrates a range in which the destination of the right-eye focus lens 113a can be set in a situation where the left-eye focus lens 113b has moved to the "near" side by a certain distance from the position shown in FIG. 6A. In this case, since the left-eye focus lens 113b has moved from the position shown in FIG. 6A, the reference position of the right-eye focus lens 113a that is located at the subject distance as measured from the center position of the wobbling operation of the left-eye focal length 113b also shifts from the position shown in FIG. 6A. And as shown in FIG. 6B, by setting a predetermined offset on each of the "far" and "near" sides with respect to that reference position, .a range is newly defined as a range in which the right-eye focus lens 113a can move independently of the left-eye focus lens 113b.

[1-3. Effects]

As can be seen from the foregoing description, according to the AF operation of this embodiment, the left- and right-eye focus lenses 113b and 113a perform their wobbling operations independently of each other, thereby maintaining their in-focus states. As a result, the autofocus operation can get done without being affected by dispersion in shape or arrangement between the individual products of the right- and left-eye optical systems (which will be sometimes referred to herein as "product dispersion").

Figure 7:
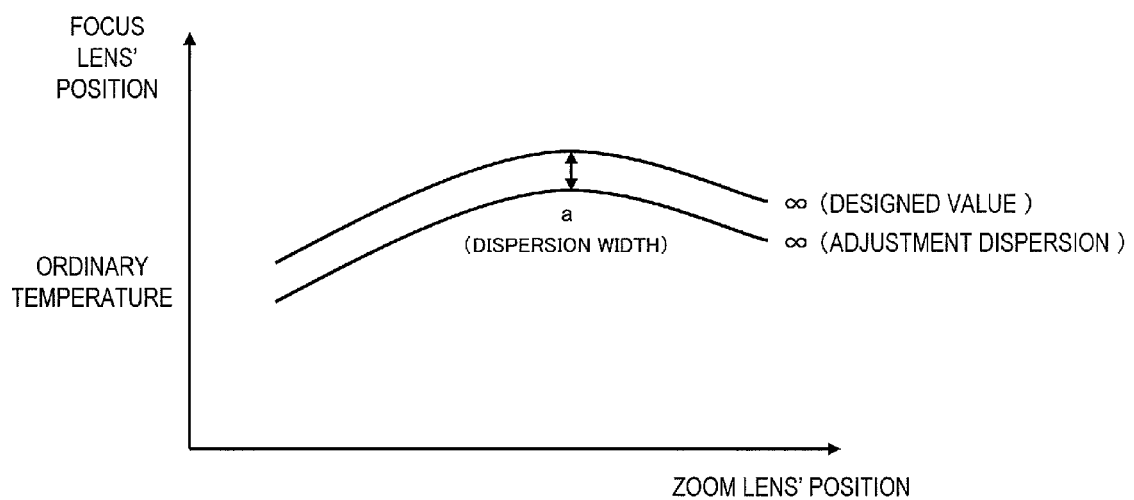
FIG. 7 shows how product dispersion is caused on zoom tracking curves at an ordinary temperature.

Generally speaking, a two-lens 3D camera will have such dispersion between the individual products of its left- and right-eye optical systems. FIG. 7 shows such product dispersion to be caused when the lens position is adjusted at an ordinary temperature. As shown in FIG. 7, even if the subject distance is the same (e.g., infinity in the example shown in FIG. 7), some adjustment error could be caused with respect to the designed value depending on the individual lens product. That is why if a position corresponding to the in-focus position of one of the right- and left-eye focus lenses was simply adopted as the in-focus position of the other focus lens, then their in-focus positions would be significantly different from each other due to the product dispersion. For that reason, according to the AF operation of this embodiment, the left- and right-eye focus lenses 113b and 113a perform their wobbling operations independently of each other. As a result, the left- and right-eye focus lenses can be moved to their appropriate in-focus positions. Consequently, it is possible to prevent such a difference in in-focus position from being caused due to the dispersion between the individual products of the right- and left-eye optical systems.

In addition, according to the AF operation of this embodiment, as the left-eye focus lens 113b changes its position while performing the wobbling operation, the reference position of the range in which the destination of the right-eye focus lens 113a can be set shifts in real time. As a result, the range in which the destination of the right-eye focus lens 113a can be set also shifts. Consequently, even if the position of the left-eye focus lens 113b has changed through the wobbling operation, the range in which the destination of the right-eye focus lens 113a can be set can be shifted to keep up with that change in real time. By restricting the movable range of the right-eye focus lens 113a in this manner with respect to the current position of the left-eye focus lens 113b, it is possible to prevent the left- and right-eye focus lenses 113b and 113a from setting a focus on multiple subjects that are located at mutually different distances from the digital camcorder 1 during their wobbling operation.

(Other Embodiments)

Although Embodiment 1 has been described herein as just an example of the technique of the present disclosure, various modifications, replacements, additions or omissions can be readily made on those embodiments as needed and the present disclosure is intended to cover all of those variations. Hereinafter, some of those other embodiments will be described.

According to the first embodiment described above, the magnitude of offset with respect to the reference position of the right-eye focus lens 113a is supposed to be a predetermined fixed value. However, the controller 210 may change the magnitude of offset according to environmental conditions. Examples of such environmental conditions include the temperature and the aperture size of the diaphragm (corresponding to the depth of field).

Figure 8A:
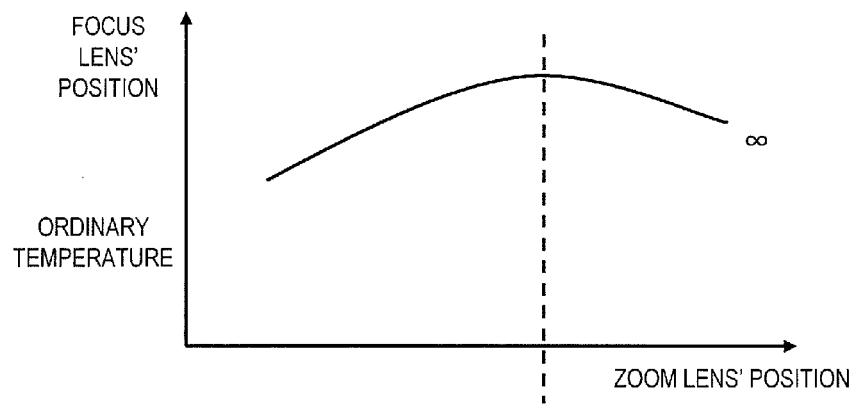
FIG. 8A shows an exemplary zoom tracking curve at an ordinary temperature.
Figure 8B:
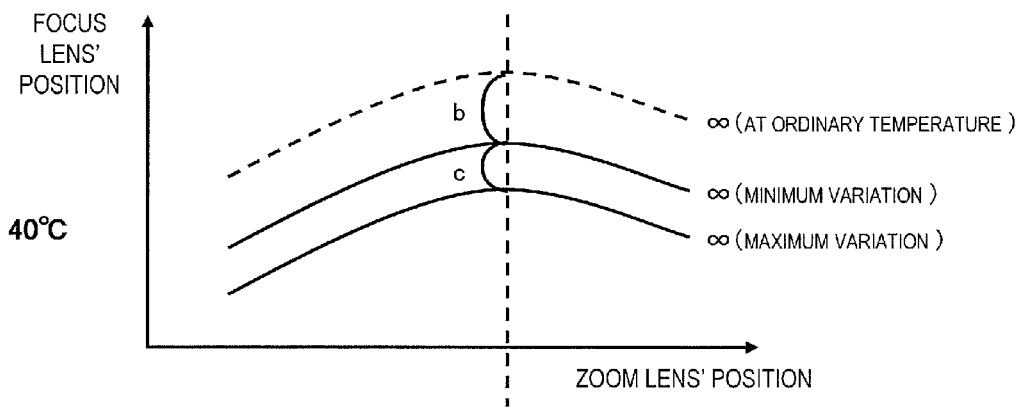
FIG. 8B shows the width of the product dispersion using zoom tracking curves at 40° C.
Figure 8C:
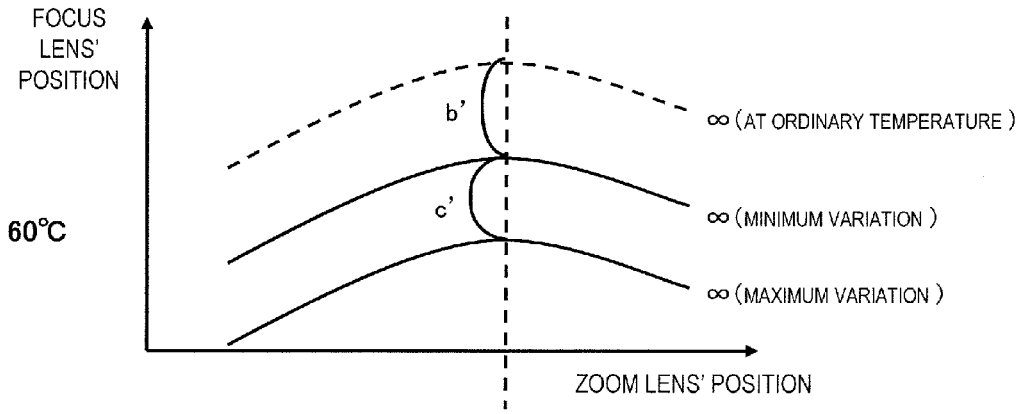
FIG. 8C shows the width of the product dispersion using zoom tracking curves at 60° C.

The degree of the dispersion between the individual products of the left- and right-eye optical systems varies according to the temperature of the environment surrounding the housing. This is caused by a slight variation in the position of each lens due to thermal expansion of the lens barrel's molded resin due to a temperature variation. FIGS. 8A to 8C show how the width of the product dispersion changes with the temperature. FIG. 8A shows an exemplary tracking curve at infinity according to a designed value at an ordinary temperature (of about 20° C.). In this description, the phrase "according to a designed value" means that the value has been determined by adjustment just before the product is shipped. Actually, there is dispersion between the individual products of the left- and right-eye optical systems, and therefore, the tracking curves of the left- and right-eye optical systems have errors with respect to what is shown in FIG. 8A.

FIG. 8B shows exemplary tracking curves at infinity when the temperature of the environment surrounding the housing is 40° C. and when the product dispersion is maximum and minimum, respectively. On the other hand, FIG. 8C shows exemplary tracking curves at infinity when the temperature of the environment surrounding the housing is 60° C., and when the product dispersion is maximum and minimum, respectively. Such tracking curve when the product dispersion is maximum and minimum: can be obtained statistically via experiments or simulations. In FIGS. 8B and 8C, also shown for the purpose of comparison is a tracking curve at infinity according to a designed value at an ordinary temperature. In FIG. 8B, the gap between the tracking curve according to the designed value and the tracking curve when the product dispersion is minimum is indicated by "b", and the gap (i.e., the width of the dispersion) between the tracking curves when the product dispersion is maximum and minimum, respectively, is indicated by "c". Also, in FIG. 8C, the gap between the tracking curve according to the designed value and the tracking curve when the product dispersion is minimum is indicated by "b'", and the width of the dispersion between the tracking curves when the product dispersion is maximum and minimum, respectively, is indicated by "c'".

As shown in FIGS. 8A to 8C, the higher the temperature, the larger the deviation from the designed value due to a variation in temperature. That is to say, b<b' and c<c' are satisfied. In other words, as the temperature rises, the difference between the tracking curves that the left- and right-eye focus lenses 113b and 113a are designed to trace tends to increase. For example, suppose a situation where the left- and right-eye focus lenses 113b and 113a trace the tracking curves that say "maximum variation" and "minimum variation", respectively, in FIG. 8C when the temperature of the environment surrounding the housing is 60° C. In that case, the left- and right-eye focus lenses 113b and 113a have a width of dispersion of c'. That is to say, while the left-eye focus lens 113b is performing a wobbling operation, unless the movable range of the right-eye focus lens 113a is determined with this width of dispersion c' taken into account, the left- and right-eye focus lenses might be unable to set a focus on the same subject. For that reason, according to this embodiment, in order to allow the left- and right-eye focus lenses to set a focus on the same subject even if the width of dispersion between the left- and right-eye focus lenses increases as the temperature rises, the magnitude of offset is increased when the movable range of the right-eye focus lens 113a is determined. That is to say, the controller 210 changes the magnitude of offset when the movable range of the right-eye focus lens 113a is defined in response to a variation in temperature. In that case, information defining a relation between the temperature and the magnitude of offset may be written in advance in the form of a table, for example, in the internal memory 280.

In FIGS. 8A to 8C, shown is how the width of the product dispersion of the tracking curves may change in a situation where the temperature rises from an ordinary temperature. However, it is known that even if the temperature falls from an ordinary temperature, the deviation of the width of the product dispersion from the designed value increases as the temperature falls from the ordinary temperature. That is why to allow the left- and right-eye focus lenses to set a focus on the same subject even if the width of dispersion increases as the temperature falls, the controller 210 may increase the magnitude of the offset when the movable range of the right-eye focus lens 113a is defined. As a result, the movable range of the right-eye focus lens 113a can be defined so that the left- and right-eye focus lenses can set a focus on the same subject even if the width of the product dispersion increases as the temperature varies. In the processing step S403 of determining whether or not the right-eye focus lens 113a is located within a range which is distant from the reference position by the magnitude of offset, the digital camcorder 1 of this embodiment determines the magnitude of offset based on the temperature indicated by the current output result of the temperature sensor 220. As a result, even if the temperature of the environment surrounding the housing has changed, the digital camcorder 1 can still adjust appropriately the movable range of the right-eye focus lens 113a in real time. It should be noted that if the temperature sensor 220 is provided for each of the left- and right-eye optical systems, the controller 210 determines the magnitude of offset based on the temperature indicated by the temperature sensor 220 that is provided for the right-eye optical system 110a.

Furthermore, the magnitude of offset does not have to be changed with the temperature but may also be changed dynamically according to the aperture size of the diaphragm of the left- and right-eye optical systems as well. The wider the aperture of the diaphragm, the smaller the depth of field gets and the more precisely the focus should be adjusted. That is why the controller 210 may decrease the magnitude of offset as the aperture size of the diaphragm is increased. Conversely, the narrower the aperture of the diaphragm, the larger the depth of field gets and the focus should not be adjusted so precisely. That is why the controller 210 may increase the magnitude of offset as the aperture size of the diaphragm is decreased.

In the processing steps S304, S305 and S401 of the first embodiment, the left-eye focus lens 113b is supposed to be used as a reference and the right-eye focus lens 113a is supposed to follow the left-eye focus lens 113b. However, this relation may be reversed. That is to say, the controller 210 may also perform a control operation so that the right-eye focus lens 113a is used as a reference and the left-eye focus lens 113b follows the right-eye focus lens 113a.

In the processing step S304 of the first embodiment described above, the focus lens 113 is supposed to be brought close to the in-focus position by performing a hill-climbing AF operation. However, the focus lens 113 may also be brought close to the in-focus position by performing a wobbling operation as in the processing step S308, instead of performing the hill-climbing AF operation. When the wobbling operation is performed instead, the AF operation cannot get done as quickly as when the hill-climbing method is adopted, but the decision can be made more accurately whether the in-focus state has been established or not.

According to the present disclosure, the AF control does not have to be performed by the method that has already been described for the embodiments. Rather, any other method may also be adopted as long as the controller 210 is configured to bring the first focus lens close to the in-focus position, move the second focus lens to the position to be determined by the position of the first focus lens that has been moved, and then move the first and second focus lenses to the in-focus position independently of each other. For example, in the processing step S308, the in-focus state may be substantially established only by performing the wobbling operation on the left- and right-eye focus lenses even without determining the reference position and the magnitude of offset as shown in FIG. 5 or moving the focus lenses with respect to the reference position or based on the magnitude of offset. Also, the hill-climbing operation and wobbling operation described above are just an example, and the focus lenses may also be brought close to the in-focus position by performing any other kind of operation. Furthermore, in determining whether or not the left- and right-eye focus lenses are located at or around the in-focus position, the method that is based on the contrast of the image does not have to be adopted but a method that uses a rangefinder may also be adopted.

Various embodiments have been described as examples of the technique of the present disclosure by providing the accompanying drawings and a detailed description for that purpose.

That is why the elements illustrated on those drawings and/or mentioned in the foregoing detailed description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The technique of the present disclosure does not have to be applied to digital camcorders, but is broadly applicable for use in any other kind of image capture device which has multiple optical systems and which can perform an AF operation. For example, the present disclosure can be used in digital still cameras and mobile electronic devices with camera, too.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image capture device, comprising:
 a first optical system including a first focus lens;
 a second optical system including a second focus lens;
 a first image sensor configured to output an electrical signal representing a subject image that has been produced through the first focus lens;
 a second image sensor configured to output an electrical signal representing a subject image that has been produced through the second focus lens; and
 a drive controller configured to move the first focus lens along a first optical axis of the first optical system and the second focus lens along a second optical axis of the second optical system, the drive controller being configured to (i) move the second focus lens to a position on the second optical axis determined by a current position of the first focus lens on the first optical axis until the first focus lens reaches a position within a predetermined threshold of an in-focus position, whereby the second focus lens moves relative to the first focus lens such that a spacing between the second focus lens and the first focus lens changes when moving the second focus lens to the position on the second optical axis determined by the current position of the first focus lens, and then (ii) move the first and second focus lenses to in-focus positions independently of each other once the first focus lens has reached the position within the predetermined threshold of the in-focus position.

2. The image capture device of claim 1, wherein the drive controller moves the first focus lens to the position within the predetermined threshold of the in-focus position, and then sets a range within which the second focus lens is going to be moved, the range being defined by an offset from a reference position, the reference position being a position of the second focus lens corresponding to a subject distance determined by the position of the first focus lens.

3. The image capture device of claim 2, wherein when the position of the second focus lens falls outside the set range, the drive controller moves the second focus lens to a position that falls within the set range.

4. The image capture device of claim 2, further comprising a temperature sensor which measures a temperature of an environment surrounding the second optical system,
wherein the drive controller determines the offset based on the temperature that has been measured by the temperature sensor.

5. The image capture device of claim 2, wherein the offset is determined based on the aperture size of a diaphragm of the second optical system.

6. The image capture device of claim 1, wherein while moving the first focus lens to the position within the predetermined threshold of the in-focus position by performing a hill-climbing autofocus operation, the drive controller moves the second focus lens to a position to be determined by a subject distance corresponding to the position of the first focus lens that has been moved, and then
the drive controller moves the first and second focus lenses to the in-focus positions independently of each other by performing a wobbling operation.

7. The image capture device of claim 1, wherein the drive controller determines, based on a contrast of an image represented by the electrical signal supplied from the first image sensor, whether or not the first focus lens is located at or around the in-focus position, and determines, based on a contrast of an image represented by the electrical signal supplied from the second image sensor, whether or not the second focus lens is located at in-focus position.

8. A program, stored on a non-transitory computer readable storage medium, to be executed by a computer in an image capture device, the device comprising:
a first optical system including a first focus lens;
a second optical system including a second focus lens;
a first image sensor configured to output an electrical signal representing a subject image that has been produced through the first focus lens;
a second image sensor configured to output an electrical signal representing a subject image that has been produced through the second focus lens; and
a drive controller configured to move the first focus lens along an optical axis of the first optical system and the second focus lens along an optical axis of the second optical system,
wherein the program is defined to make the drive controller perform the steps of:
moving the first focus lens to a position within a predetermined threshold of an in-focus position;
moving the second focus lens to a position on the second optical axis determined by a current position of the first focus lens on the first optical axis until the first focus lens reaches the position within the predetermined threshold of the in-focus position, whereby the second focus lens moves relative to the first focus lens such that a spacing between the second focus lens and the first focus lens changes when moving the second focus lens to the position on the second optical axis determined by the current position of the first focus lens; and
moving the first and second focus lenses to in-focus positions independently of each other once the first focus lens has reached the position within the predetermined threshold of the in-focus position.

* * * * *